No. 732,010. PATENTED JUNE 23, 1903.
G. C. SAVAGE.
FLUID CONTROLLING VALVE.
APPLICATION FILED JUNE 20, 1902.
NO MODEL.

WITNESSES:
Percy C Bowen
M H Miley

INVENTOR
G. C. Savage
BY Howson & Howson,
Attorneys

No. 732,010.

Patented June 23, 1903.

UNITED STATES PATENT OFFICE.

GILES CHRISTOPHER SAVAGE, OF NASHVILLE, TENNESSEE.

FLUID-CONTROLLING VALVE.

SPECIFICATION forming part of Letters Patent No. 732,010, dated June 23, 1903.

Original application filed April 23, 1902, Serial No. 104,335. Divided and this application filed June 20, 1902. Serial No. 112,484. (No model.)

*To all whom it may concern:*

Be it known that I, GILES CHRISTOPHER SAVAGE, a citizen of the United States, and a resident of Nashville, Davidson county, State of Tennessee, have invented certain new and useful Improvements in Fluid - Controlling Valves, of which the following is a specification.

My invention relates to valves for controlling the circulation of fluid or liquid in a fluid circulating and distributing system—such, for example, as a hot-water heating and distributing system; and my object is to provide a valve for this purpose which will at all times permit a full opening for the circulation of fluid through the valve-casing and into the system and by which the current of fluid or liquid may be caused to pass either wholly through one portion of the system or divided between two or more portions, according to the extent of opening of the ports which are governed by the valve.

With these objects in view my invention consists in the novel construction of valve and the combination of parts and details thereof, as hereinafter described with reference to the accompanying drawings and more particularly pointed out in the claims.

Figure 1:
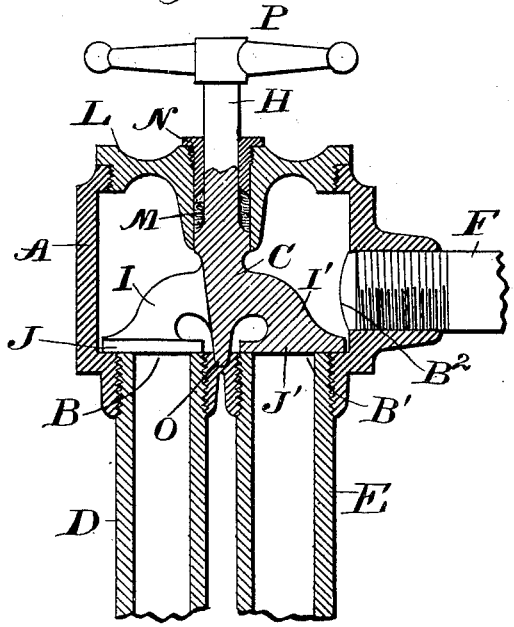
Figure 2:
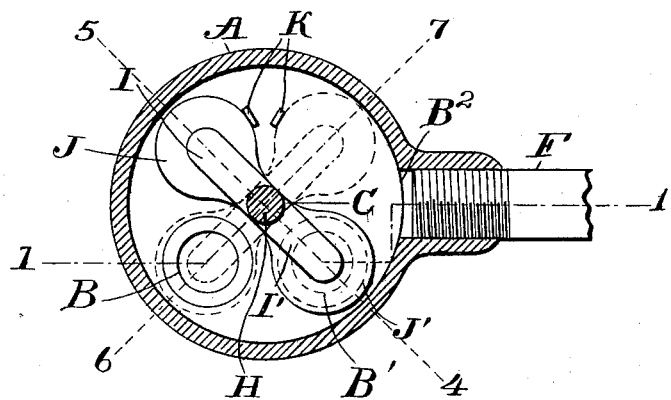

In the drawings, Figure 1 is a vertical sectional view of my improved controlling-valve on the line 1 1, Fig. 2; and Fig. 2 is a sectional plan view of the same.

As shown in the drawings, my valve is embodied in a form especially adapted for use in connection with a hot-water heating and distributing system in which the pipe E may be connected to the return from various distributing-points—such as a radiator, bathtub, basin, &c.—and the pipe D connected with the hot-water reservoir or boiler, while the pipe F may connect with the hot-water back of the heater through which the water passes to the system of pipes for distributing water to the various points desired. It is to be understood, however, that my valve is not limited in its use to hot-water systems or other liquid systems, as it may be applied to any fluid system where the conditions are such as to render it necessary or make it desirable to control the circulation in the manner effected by the use of my valve. In describing my invention, therefore, as a matter of convenience I will refer to the same as applied to a hot-water-distributing system, with the understanding that it is not limited thereto, and in using the term "fluid" in the claims I intend to cover the application of my invention to systems which employ fluids or liquids.

Referring to the drawings, in which the same reference characters designate the same or corresponding parts in both views, the letter A indicates a valve-casing provided with a plurality of ports or openings B, B', and B², the first two of which are controlled by the valve C. Each port is connected with a pipe D, E, and F, forming the returns from the reservoir or boiler and the circulating system or connections with various ports of the system. The opening B² in the casing is free from control of the valve.

The valve C is so constructed and arranged with reference to the ports B and B' that it will in one extreme position entirely close communication with the pipe D, thereby cutting off circulation from that part of the system connected with the pipe D, and in the other extreme position it will entirely close the pipe E, thereby cutting off the circulation or flow through that part of the system connected with E, and when the valve occupies intermediate positions one of the ports will be partially open to the same extent that the other is closed, so that at all times there is a full opening for the flow of fluid or liquid through the system by way of the valve-casing—that is to say, an opening equal to the cross-sectional area of the pipe. It is obvious that a double circuit of fluid or liquid may be maintained by the use of my double-circuit valve, and in the case of a hot-water heating system a safety means is provided in the circuit of the system because of the full opening at all times for a free circulation of water equal to the area of one of the pipes, and especially when applied to a system such as that described and claimed in my application numbered 104,335, filed April 23, 1902, of which this application is a division.

The preferred form of my valve consists of a stem H, from which extend two arms I and I', terminating in disks J and J' of sufficient diameter to cover each of the ports B and B'. These ports are preferably placed in the same plane on the same side of the diametrical line of the valve-casing, within which the valve is adapted to be rotated by turning the stem through the medium of a suitable handle P, so that when the valve is moved one disk will uncover the port leading to one pipe as the other disk closes the port leading to the other pipe and to the same extent. For example, in Fig. 2 in the position indicated by the lines 5 4 the valve-disk J' completely covers the port B', and hence the pipe E, while the disk J uncovers the port B and opens communication with the pipe D, and in the position indicated by the lines 6 7 the reverse condition exists, while in intermediate positions the two ports will be partially open, thereby dividing the current between the two pipes D and E.

Suitable stops K are provided for limiting the movements of the valve in either extreme position, and the valve-stem H projects through a suitable stuffing-box in the cap L, having a suitable packing M, which stuffing-box is closed by a cap N. A projecting boss or stud O on the stem engages a recess in the valve-seat to assist in centering the valve in proper position, the stem turning in bearings afforded by the cap and the said recess. The handle P is preferably located in the same plane with the line passing diametrically through the two valve-disks, whereby the positions of the said disk may be readily indicated by the position of the said handle.

I claim as my invention—

1. As an improvement in controlling-valves for fluid-distributing systems, the combination of a valve-casing having a free opening communicating with a fluid-supply pipe of the system, a plurality of ports in the valve-seat of the casing adapted to communicate with other pipes of the system, and a disk-valve structure arranged to operate in connection with the said ports and adapted to close and open the ports to the same extent, whereby the current may be either divided between the ports in proportion to the opening thereof, or fully directed through one of the ports, substantially as described.

2. As an improvement in controlling-valves for fluid-distributing systems, the combination with a valve-casing having three ports or openings, two of which are in the valve-seat in said casing each connected with a distributing-pipe of the system and the other freely opening into the casing and connected with a supply-pipe of the system, of a disk-valve structure arranged to operate in connection with the two ports in the valve-seat and adapted to close one to the same extent that it opens the other, whereby the current may be fully directed through either of the ports or divided between them in proportion to the opening of the ports by the valve, substantially as described.

3. As an improvement in controlling-valves for fluid-distributing systems, the combination with a valve-casing having three ports or openings, one connected to the supply-pipe of the system and the others to distributing-pipes of said system, of a disk-valve structure arranged to operate in connection with two of the ports and adapted to close one to the same extent that it opens the other, whereby the current may be fully directed through either of the ports or divided between them in proportion to the opening of the ports by the valve, substantially as described.

4. As an improvement in controlling-valves for fluid-distributing systems, the combination of a valve-casing having three ports or openings, one connected to the supply-pipe of the system and the others to distributing-pipes of said system, of a valve for controlling two of the ports comprising a rotatable stem having two disks thereon arranged to cover and uncover the said ports to the same extent, as the valve-stem is rotated, substantially as described.

5. As an improvement in controlling-valves for fluid-distributing systems, the combination with a valve-casing having three ports, two of which are located on the same side of a diametrical line of the casing, of a valve having two disks each adapted to cover and uncover one of the ports and to the same extent as the other port is uncovered and covered by its disk, substantially as described.

6. As an improvement in controlling-valves for fluid-distributing systems, the combination with a valve-casing having a plurality of ports, two of which are located in the same plane and on the same side of a diametrical line of the valve-casing, of a valve consisting of an operating-stem having two disks each arranged to move over one of the ports and cover and uncover the same to the same extent that the other uncovers and covers its port, substantially as described.

In testimony whereof I have signed my name to this specification in the presence of two subscribing witnesses.

GILES CHRISTOPHER SAVAGE.

Witnesses:
  R. S. DORK,
  G. H. SAVAGE.